United States Patent
Cho (10) Patent No.: US 10,972,198 B2
(45) Date of Patent: Apr. 6, 2021

(54) DEVICE AND METHOD FOR RECEIVING AND MEASURING WIRELESS SIGNAL

(71) Applicant: Samsung Electronics Co., Ltd., Suwon-si (KR)

(72) Inventor: Minsung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/655,800

(22) Filed: Oct. 17, 2019

(65) Prior Publication Data
US 2020/0127744 A1   Apr. 23, 2020

(30) Foreign Application Priority Data

Oct. 19, 2018   (KR) ........................ 10-2018-0125493

(51) Int. Cl.
*H04B 17/00*   (2015.01)
*H04B 17/309*   (2015.01)

(52) U.S. Cl.
CPC .................................. *H04B 17/309* (2015.01)

(58) Field of Classification Search
CPC .......... H04B 17/309; H04B 1/40; H01Q 1/48; H01Q 7/005; H01Q 1/243; H01Q 9/0442; H01Q 9/145; H01Q 13/103; H01Q 9/042
USPC ...................................................... 455/67.7
See application file for complete search history.

(56) References Cited

U.S. PATENT DOCUMENTS

| 9,608,331 | B1 * | 3/2017 | Rowson | ............... H01Q 9/0442 |
| 2004/0253987 | A1 | 12/2004 | Lee | |
| 2010/0238083 | A1 * | 9/2010 | Malasani | ............... H01Q 1/125 343/765 |

(Continued)

FOREIGN PATENT DOCUMENTS

| EP | 3 352 295 A1 | 7/2018 |
| EP | 3 553 975 A1 | 10/2019 |

(Continued)

OTHER PUBLICATIONS

International Search Report and Written Opinion Report dated Feb. 5, 2020, issued in International Application No. PCT/KR2019/013684.

*Primary Examiner* — Kathy W Wang-Hurst
*Assistant Examiner* — Max Mathew
(74) *Attorney, Agent, or Firm* — Jefferson IP Law, LLP (57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). The disclosure is to receive and measure a wireless signal, and provides a device for measuring a wireless signal. The device includes a first antenna set including a plurality of antennas having adjustable oriented directions, a second antenna set including a plurality of antennas having fixed oriented directions, and at least one processor configured to receive and analyze wireless signals by using the first antenna set and the second antenna set, wherein the at least one processor may adjust the oriented directions of the plurality of antennas included in the first antenna set, receive the wireless signals by using the first antenna set and the second antenna set, and control to analyze the wireless signals.

21 Claims, 10 Drawing Sheets

(56) References Cited

U.S. PATENT DOCUMENTS

| | | | | |
|---|---|---|---|---|
| 2012/0009983 | A1* | 1/2012 | Mow | H04B 1/40 |
| | | | | 455/575.7 |
| 2012/0299785 | A1* | 11/2012 | Bevelacqua | H01Q 5/328 |
| | | | | 343/702 |
| 2014/0266922 | A1* | 9/2014 | Jin | H01Q 5/314 |
| | | | | 343/702 |
| 2014/0333496 | A1* | 11/2014 | Hu | H01Q 9/0421 |
| | | | | 343/745 |
| 2016/0064801 | A1* | 3/2016 | Han | H01Q 5/328 |
| | | | | 343/702 |
| 2018/0062264 | A1* | 3/2018 | Martinis | H01Q 9/42 |
| 2018/0152220 | A1 | 5/2018 | Mow et al. | |
| 2019/0036360 | A1* | 1/2019 | Zilles | A63B 43/004 |
| 2019/0131688 | A1* | 5/2019 | Ramasamy | G06F 1/1683 |
| 2019/0273542 | A1* | 9/2019 | Dong | H01Q 21/28 |
| 2019/0356397 | A1* | 11/2019 | DaSilva | G01R 29/10 |
| 2020/0127744 | A1* | 4/2020 | Cho | H04B 17/309 |

FOREIGN PATENT DOCUMENTS

| | | |
|---|---|---|
| JP | H0669714 A | 3/1994 |
| JP | 2009-77128 A | 4/2009 |
| KR | 10-2015-0059104 A | 5/2015 |
| KR | 10-1845716 B1 | 4/2018 |
| KR | 10-2018-0083763 A | 7/2018 |
| WO | 2018/159944 A1 | 9/2018 |

* cited by examiner

DEVICE AND METHOD FOR RECEIVING AND MEASURING WIRELESS SIGNAL

CROSS-REFERENCE TO RELATED APPLICATION(S)

This application is based on and claims priority under 35 U.S.C. § 119(a) of a Korean patent application number 10-2018-0125493, filed on Oct. 19, 2018, in the Korean Intellectual Property Office, the disclosure of which is incorporated by reference herein in its entirety.

BACKGROUND

1. Field

The disclosure relates to a wireless signal. More particularly, the disclosure relates to a device and method for receiving and measuring a wireless signal.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, during a development process of a communication system, a procedure of measuring and analyzing a signal in a real communication environment is performed. Since the 5G system uses a higher frequency band than a cellular system of the related art, it is difficult to use measurement/analysis equipment of the related art as it is. Therefore, there is a need for a method for receiving and measuring/analyzing a wireless signal in consideration of characteristics of the 5G system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method for effectively receiving and measuring a wireless signal.

Another aspect of the disclosure is to provide a device and method for receiving and measuring a wireless signal by using a directional antenna.

Additional aspects will be set forth in part in the description which follows and, in part, will be apparent from the description, or may be learned by practice of the presented embodiments.

In accordance with an aspect of the disclosure, a device for measuring a wireless signal is provided. The device includes a first antenna set including a plurality of antennas having adjustable oriented directions, a second antenna set including a plurality of antennas having fixed oriented directions, and at least one processor configured to receive and analyze wireless signals by using the first antenna set and the second antenna set. The at least one processor may adjust the oriented directions of the plurality of antennas included in the first antenna set, receive the wireless signals by using the first antenna set and the second antenna set, and control to analyze the wireless signals.

In accordance with another aspect of the disclosure, a method for measuring a wireless signal is provided. The method includes adjusting oriented directions of a plurality of antennas which are included in a first antenna set and have adjustable oriented directions, receiving wireless signals by using the first antenna set and a second antenna set including a plurality of antennas having fixed oriented directions, and analyzing the wireless signals.

A device and method according to various embodiments of the disclosure can effectively analyze a high-frequency wireless signal by adjusting oriented directions of directional antennas and receiving and measuring the signal.

Other aspects, advantages, and salient features of the disclosure will become more apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe embodiments and are not intended to limit the disclosure. A singular expression may include a plural expression unless they are definitely different in a context.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to a device and method for receiving and measuring a wireless signal. Particularly, the disclosure describes a technique for receiving and measuring a wireless signal by using a directional antenna.

The terms referring to a device, the terms referring to elements of the device, the terms referring to a signal or properties of the signal, and the like, which are used in the following description, are used for convenience of description. Accordingly, the disclosure is not limited to the following terms and other terms having the same technical meaning may be used. For example, equipment for receiving and measuring a wireless signal according to various embodiments may be referred to hereinafter as a "measurement device", and may be referred to as a "wireless measurement device", an "analysis device", a "wireless signal analysis device", and "measurement equipment", "wireless measurement equipment", "analysis equipment", "wireless signal analysis equipment" or other terms having equivalent technical meanings.

Since general radio wave measurement equipment is designed such that only one antenna can be connected to each receiver, there is a limitation in signal reception performance. In consideration of high frequency characteristics, it is preferable to use a directional antenna rather than an omnidirectional antenna. However, the directional antenna has a narrower reception range than the omnidirectional antenna. Accordingly, hereinafter, the disclosure proposes various embodiments for securing a signal reception range equal to that of an omnidirectional antenna by using directional antennas.

Figure 1A:
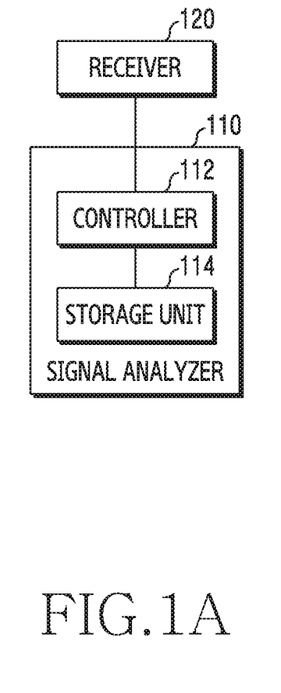
FIG. 1A illustrates a configuration of a measurement device according to an embodiment of the disclosure.

FIG. 1A illustrates a configuration of a measurement device according to an embodiment of the disclosure.

Referring to FIG. 1A, the measurement device includes a signal analyzer 110 and a receiver 120.

The signal analyzer 110 analyzes wireless signals received through the receiver 120. For example, the signal analyzer 110 may analyze various factors related to the signals (for example, antenna gain, system gain, cable loss, signal strength, etc.). An analysis result obtained by the signal analyzer 110 may be generated for each antenna, and analysis data for each antenna may include characteristic values on a time axis. In addition, the signal analyzer 110 may include representative values (for example, average, movement average, etc.) for all the antennas or a subset of the antennas.

The signal analyzer 110 may include a controller 112 and a storage unit 114. The controller 112 may be implemented as at least one processor, perform an analysis operation, and control an operation of another element (for example, the receiver 120). The storage unit 114 may store a program, an instruction, and configuration data, which may be required for an operation of the measurement device, and store an analysis result. The controller 112 may control the measurement device to perform operations according to various embodiments described below.

The receiver 120 receives a wireless signal. To this end, the receiver 120 may include at least one antenna and a reception circuit (for example, an amplifier and a signal path). According to various embodiments, at least one antenna included in the receiver 120 may be a directional antenna. For example, the receiver 120 may be configured as shown in FIG. 1B.

Although not shown in FIG. 1A, the measurement device may further include a display unit and an input unit. The display unit may display an analysis result of a signal and an interface for controlling the measurement device according to the control of the controller 112. The input unit may detect a user's input and provide the detected input to the controller 112. For example, the input unit may include a keyboard, a button, and the like.

Figure 1B:
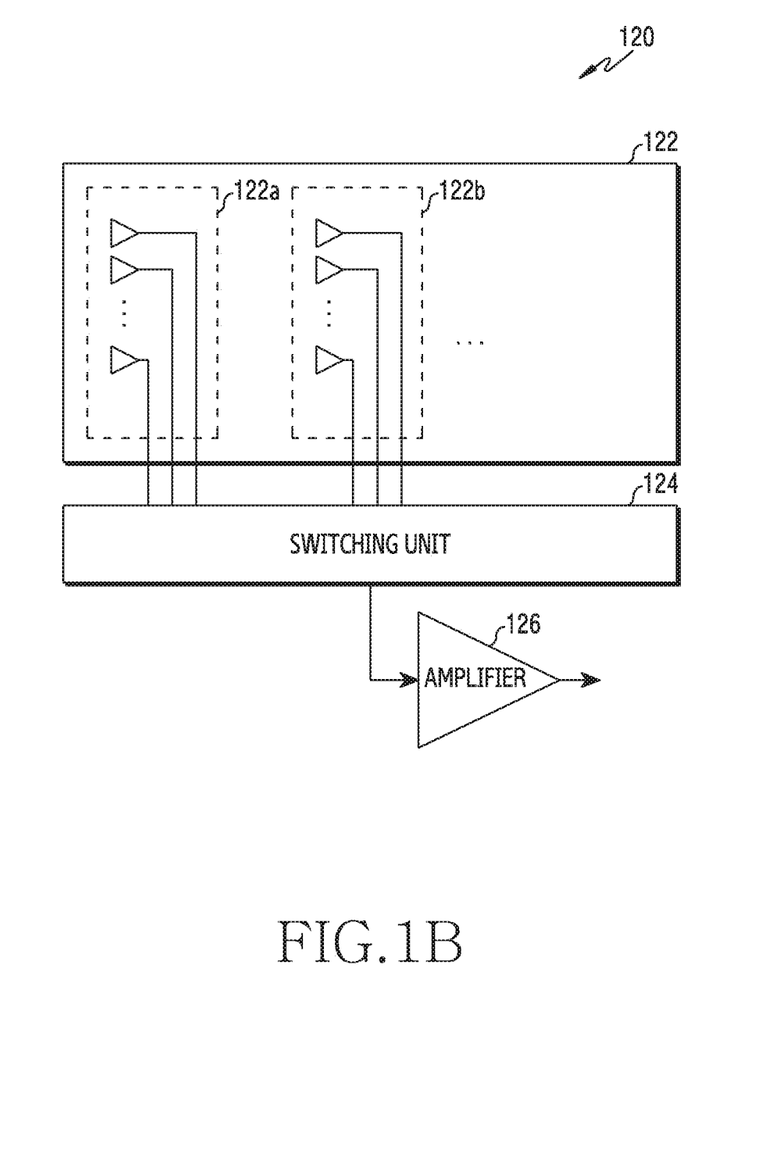
FIG. 1B illustrates a configuration of a receiver included in a measurement device according to an embodiment of the disclosure.

FIG. 1B illustrates a configuration of a receiver included in a measurement device according to an embodiment of the disclosure. FIG. 1B may be understood as a configuration of the receiver 120.

Referring to FIG. 1B, the receiver 120 includes an antenna unit 122, a switching unit 124, and an amplifier 126.

The antenna unit 122 includes a plurality of antennas, and the plurality of antennas are classified into a plurality of antenna sets. The plurality of antenna sets may include a first antenna set 122a and a second antenna set 122b. The plurality of antennas included in the antenna unit 122 may be directional antennas, and the directional antennas may be arranged toward directions different from each other. For example, the directional antennas may be implemented as a horn antenna.

Directional antennas included in at least one set (for example, the first antenna set 122a) among the plurality of antenna sets may be designed to adjust an oriented angle. To this end, although not shown in FIG. 1B, a driving means for adjusting oriented angles of the directional antennas may be further included. Each of the oriented angles of the directional antennas may be adjusted independently. Directional antennas included in at least one set (for example, the second antenna set 122b) among the plurality of antenna sets may be designed to have a fixed oriented angle.

The switching unit 124 is connected to the plurality of antennas included in the antenna unit 122 and connects at least one of the plurality of antennas to the amplifier 126. The switching unit 124 may provide signals received through the plurality of antennas to the amplifier 126 by sequentially establishing paths with the plurality of antennas according to the control of the controller 112. To this end, the switching unit 124 may include at least one switching board or switch board.

According to an embodiment, the switching unit 124 may include one switch. In this case, the switching unit 124 may connect one antenna to the amplifier 126 at a specific time. When all the plurality of antennas are connected, losses corresponding to the number of connected antennas may occur. In order to prevent such a loss, only one switch is used. By using only one switch, only one antenna is connected to a reception path at a time, the reception path is cycled, and thus data can be collected while a loss is minimized. According to another embodiment, the switching unit 124 may include as many switches as the number of antenna sets.

The amplifier 126 amplifies a signal received through the antenna unit 122. For example, the amplifier 126 may be implemented as a low noise amplifier (LNA). The receiver 120 may include the amplifier 126 to address a problem in that a radio wave arrival distance of a high frequency is shortened. According to an embodiment, for ease of movement measurement, the amplifier 126 may include one LNA.

Figure 2A:
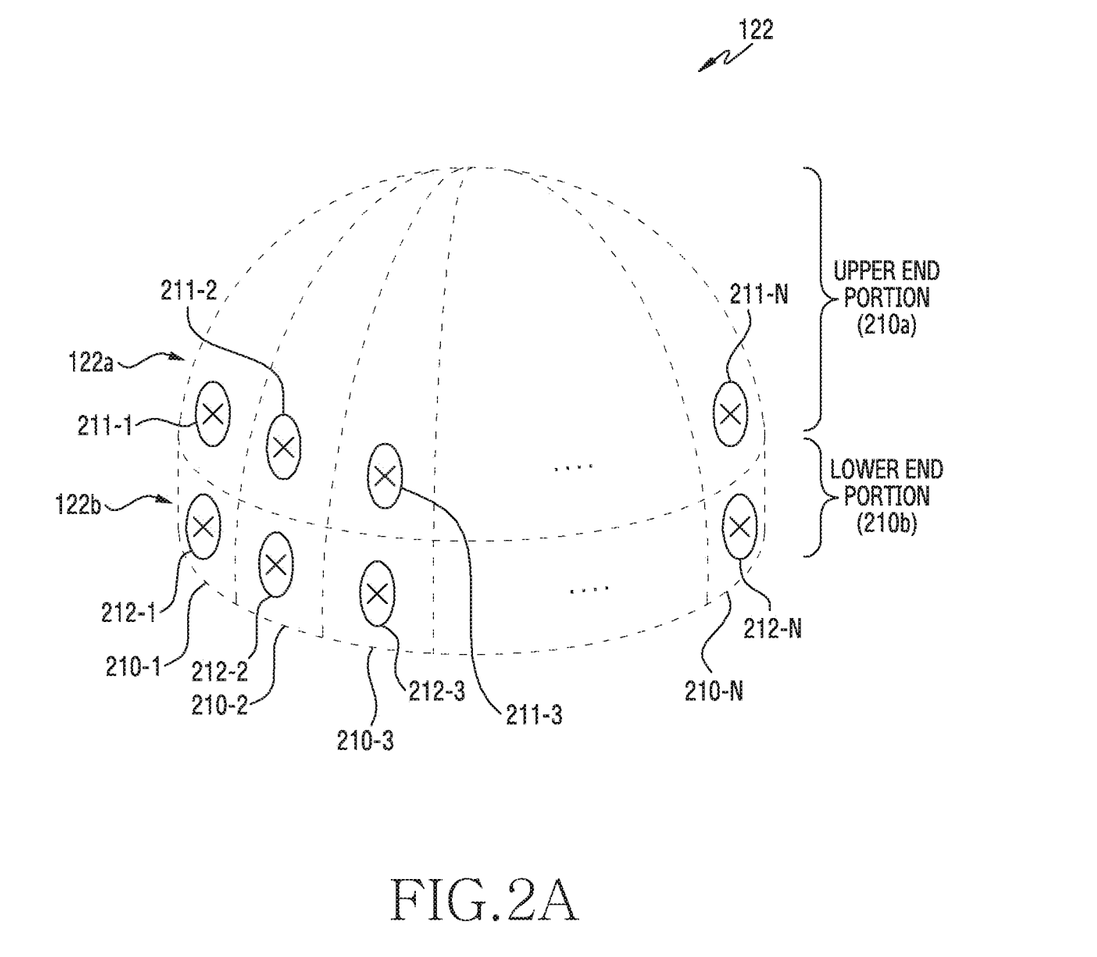
FIG. 2A illustrates an implementation example of a receiver according to an embodiment of the disclosure.

FIG. 2A illustrates an implementation example of a receiver according to an embodiment of the disclosure.

Figure 2B:
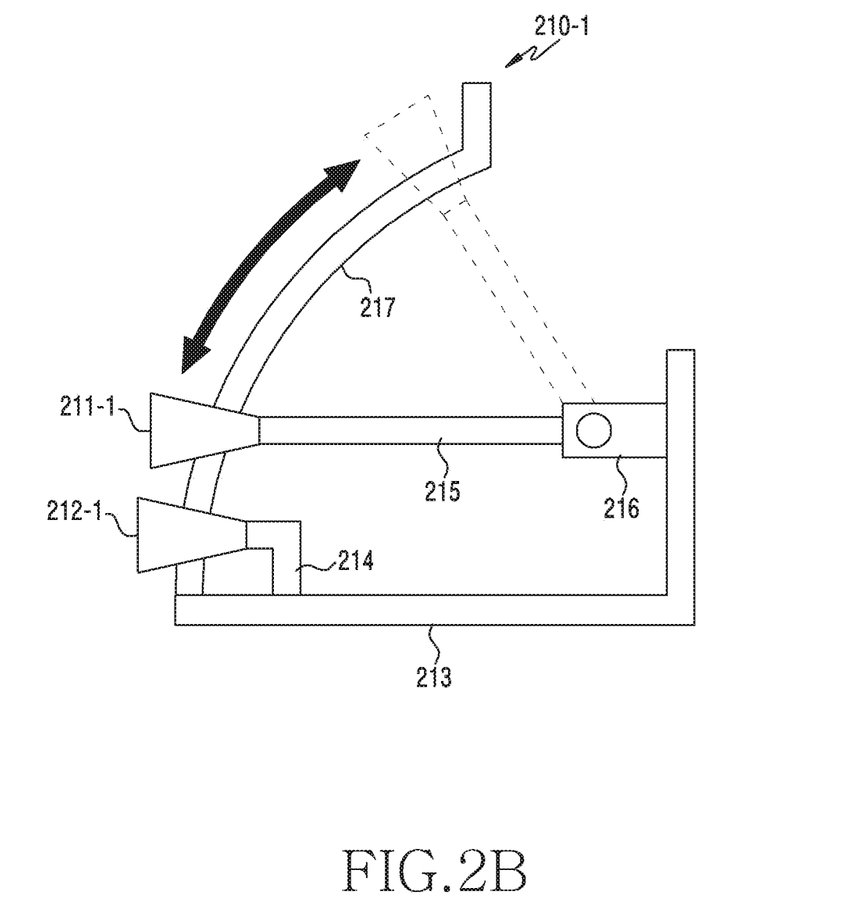
FIG. 2B illustrates an implementation example of a receiver according to an embodiment of the disclosure.

FIG. 2B illustrates an implementation example of a receiver according to an embodiment of the disclosure.

Figure 2C:
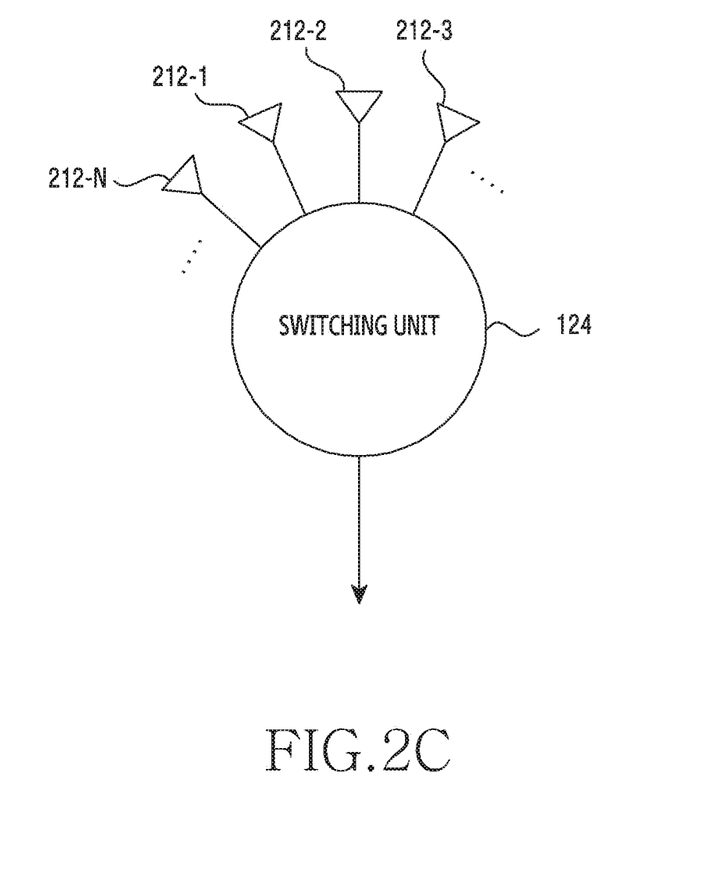
FIG. 2C illustrates an implementation example of a receiver according to an embodiment of the disclosure.

FIG. 2C illustrates an implementation example of a receiver according to an embodiment of the disclosure. In the example illustrated in FIGS. 2A to 2C, two antenna sets in the antenna unit 122 have a dual structure along a vertical axis.

Referring to FIG. 2A, two antenna sets may be arranged in a hemispherical shape. To this end, the antenna unit 122 may include a housing and various support members for fixing antennas. Antennas 211-1, 211-2, 211-3, . . . 211-N included in the first antenna set 122a disposed in an upper end portion 210a of a semi-circular sphere have a structure capable of adjusting an oriented angle, and antennas 212-1, 212-2, 212-3, . . . 212-N included in the second antenna set 122b disposed in a lower end portion 210b of the semi-circular sphere have fixed oriented angles. For example, when a signal passing through a high obstacle arrives from a signal source, an arrival angle of the signal has a high deviation along the vertical axis. Therefore, the antennas 211-1 to 211-N included in the upper end portion 210a among the dually arranged antennas are configured to be movable up and down by using an electrical device. According to an embodiment, in consideration of commercial high frequency characteristics, each antenna set may include 16 antennas having a beam width of 25 degrees, and the antennas may be configured to cover a 360-degree direction.

One antenna (for example, antenna 211-1) disposed in the upper end portion 210a and one antenna (for example, antenna 212-1) disposed in the lower end portion 210b form one antenna pair (for example, antenna pair 210-1). Accordingly, the antenna unit 122 includes N antenna pairs 210-1, 210-2, 210-3, . . . 210-N. One antenna pair may cover the same horizontal angle, and the antenna 211-1 disposed in the upper end portion 210a may cover a vertical angle in a predetermined range by adjusting an oriented angle in a vertical direction. In order to adjust the oriented angle of the antenna, the controller 112 may generate a control signal for vertical movement of the antenna 211-1.

As shown in FIG. 2A, various embodiments of the disclosure may provide an effect, such as using an omnidirectional antenna, by arranging directional antennas in a hemispherical shape. The directional antennas may be configured to cover a 360-degree direction in a horizontal direction and may be arranged in a plurality of rows in a vertical direction. Further, at least one upper end row of the antennas may be configured to be movable by an angular degree.

For example, the antenna pair 210-1 may be configured as shown in FIG. 2B.

Referring to FIG. 2B, the antenna 212-1 is fixed to a base member 213 through a first fixing member 214. The antenna 211-1 is connected to a driving unit 216 through a second fixing member 215, and the driving unit 216 is fixed to the base member 213. The antenna 211-1 moves along a guide member 217, and a vertical oriented angle is changed according to the movement.

Referring to FIG. 2C, the antennas 212-1 to 212-N included in the second antenna set 122b may be arranged in a circular shape and may be connected to the switching unit 124. The antennas 211-1 to 211-N included in the first antenna set 122a may also be arranged in a circular shape and may be connected to the switching unit 124.

Figure 3:
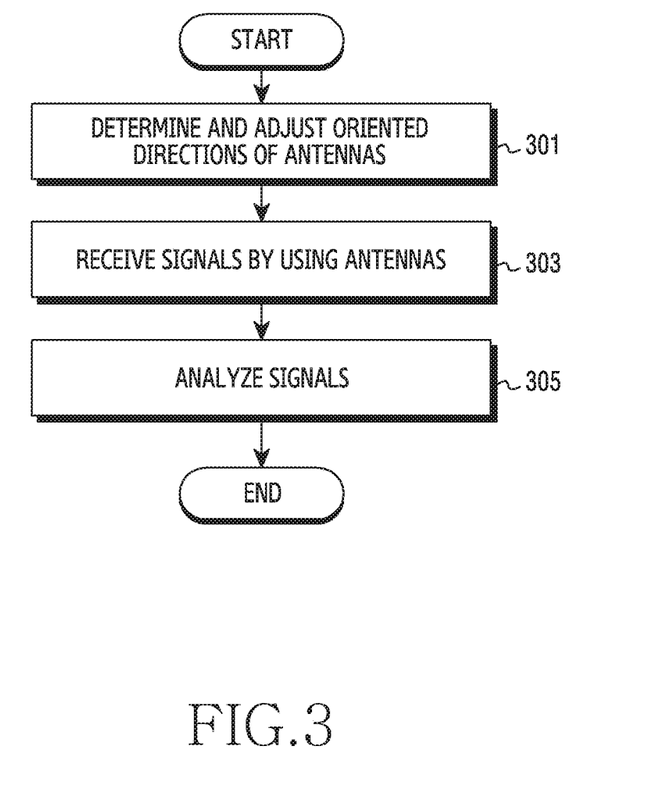
FIG. 3 illustrates a flowchart for receiving and measuring a wireless signal by a measurement device according to an embodiment of the disclosure.

FIG. 3 illustrates a flowchart for receiving and measuring a wireless signal by a measurement device according to an embodiment of the disclosure.

Referring to FIG. 3, the measurement device determines oriented directions of antennas and controls the antennas according to the determined oriented directions in operation 301. The oriented directions of the antennas may be determined according to measurement scheduling. The oriented directions of the antennas may be determined according to a measurement algorithm or may be determined according to a user's command. A user can monitor a received signal and, if necessary, can determine an appropriate arrival angle of the signal by moving the antennas in the upper end portion. When an oriented direction is determined, the measurement device may adjust vertical angles of antennas included in at least one antenna set to arrange the antennas. Otherwise, the measurement device may adjust so as to allow a designated antenna to be oriented to a specific horizontal angle by rotating the antenna unit.

In operation 303, the measurement device receives signals by using the antennas. According to an embodiment, the measurement device may control a switch so as to receive and collect signals by sequentially using the plurality of antennas. Through the operation, the measurement device may collect signals received by the plurality of antennas through one reception path. In this case, the reception path may include an LNA. That is, the measurement device may amplify the signals received through the antennas.

In operation 305, the measurement device analyzes the signals. That is, the measurement device may analyze the signals received through the plurality of antennas. Since information on an antenna which receives the signals is provided, an angle of arrival (AOA) of the signals may be obtained from an oriented direction of the antenna.

As described with reference to FIG. 3, the plurality of antennas are adjusted to have different oriented directions. Accordingly, an arrival angle of a received signal may be easily identified from an oriented direction of an antenna. To this end, before the measurement is performed, the measurement device may estimate and correct the oriented angle of the antenna. For example, the estimation and correction of the oriented angle of the antenna may be performed using a global positioning system (GPS) signal.

According to an embodiment, the measurement device may estimate and correct a reception direction angle of each antenna by applying a differential GPS (DGPS). For example, the measurement device may estimate an oriented direction of a specific antenna by a signal of the DGPS by linking directions of antenna #1 and the DGPS. In more detail, if a movement direction of the measurement device is identified using a GPS or DGPS, it may be determined that an oriented direction of an antenna facing the movement direction corresponds to the movement direction. That is, since the movement direction measured by using the GPS or DGPS includes longitude and latitude coordinates, the measurement device may calculate an azimuth angle from the coordinate values, and may determine the calculated azimuth angle as an oriented direction of a corresponding antenna, that is, an arrival angle.

The measurement device may link corrected direction information to the remaining antennas, based on beam widths and the number of the remaining antennas. When an arrival angle for one antenna is determined using the coordinate values of the movement direction, the measurement device may estimate arrival angles for the remaining antennas. For example, if 16 antennas having a beam width of 22.5 degrees are arranged, when antenna #1 is aligned to 0 degrees, the arrival angles of the remaining antennas may be corrected by adding or subtracting a multiple of 22.5 to an arrival angle of antenna #1. For example, an arrival angle of antenna #2 adjacent to antenna #1 may be replaced with a value obtained by correcting the arrival angle of antenna #1 by 22.5 degrees. Through these operations, an arrival angle of each antenna at a position where the measurement device moves may be identified.

Accordingly, a signal reaching each antenna is linked to the DGPS, and all the signals may be stored and recorded together with an arrival angle and the amount (e.g., signal strength) of a received signal. In this case, in consideration of the occurrence of a plurality of overlapping position signals in the same antenna, information on the signals may be stored after interval averaging.

A wireless signal may be distorted while passing through a channel. For example, when a transmitter terminal or a receiver terminal moves, a difference between a frequency of a signal at the time of transmission and a frequency of a signal at the time of reception may occur due to the Doppler effect.

Figure 4:
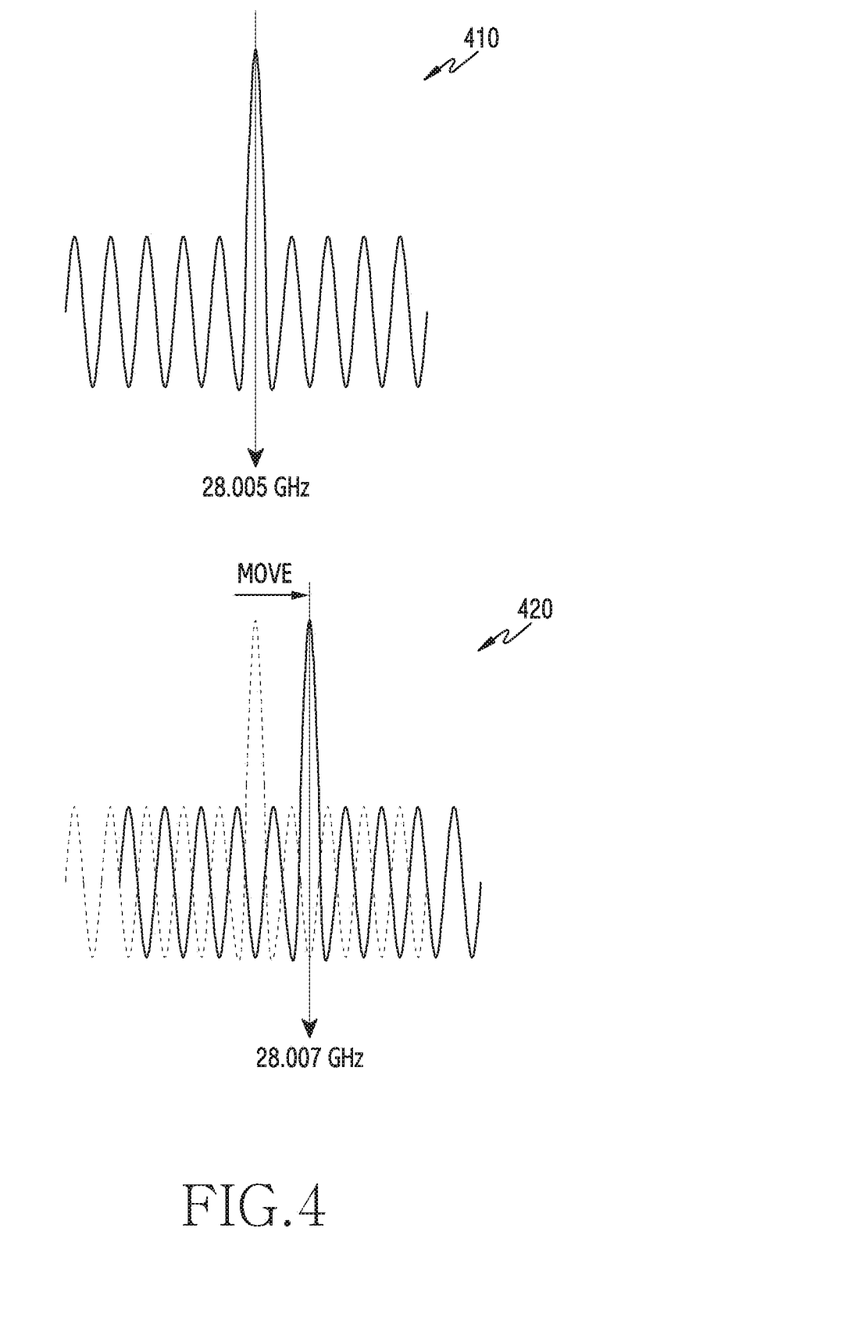
FIG. 4 illustrates an influence of the Doppler effect on a wireless signal according to an embodiment of the disclosure.

FIG. 4 illustrates an influence of the Doppler effect on a wireless signal according to an embodiment of the disclosure.

Referring to FIG. 4, a frequency of a peak component of a signal 410 may be 28.005 GHz at the time of transmission. However, due to the Doppler effect, a frequency of a peak component of a signal 420 may be 28.007 GHz at the time of reception. That is, a phenomenon in which the peak component moves on a frequency axis may occur. Accordingly, since a frequency of a signal transmitted for measurement may not be constant, the measurement device receives a signal within a predetermined bandwidth by using short divided bands, and selectively processes an interval in which a peak signal is received within a spectrum of the same reception time zone, so as to measure only a signal to be actually measured. Example operations for measurement will be described hereinafter with reference to FIG. 5.

Figure 5:
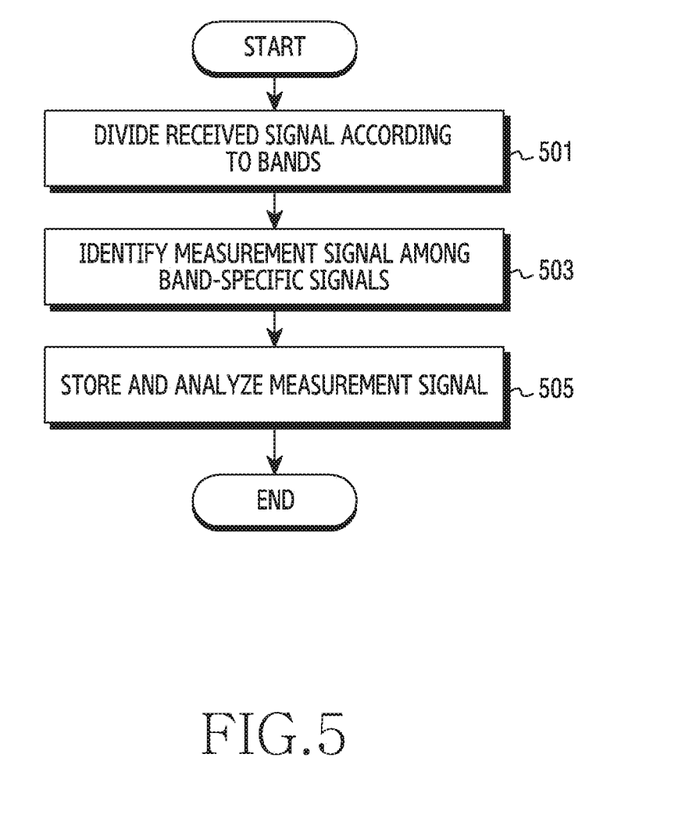
FIG. 5 illustrates a flowchart for extracting a measurement signal by a measurement device according to an embodiment of the disclosure.

FIG. 5 illustrates a flowchart for extracting a measurement signal by a measurement device according to an embodiment of the disclosure.

Referring to FIG. 5, the measurement device divides a received signal according to bands in operation 501. Each band has a smaller width than the total bandwidth for signal reception. Accordingly, one received signal is divided into a plurality of band-specific partial signals. The partial signals may be referred to as narrowband signals.

Figure 6:
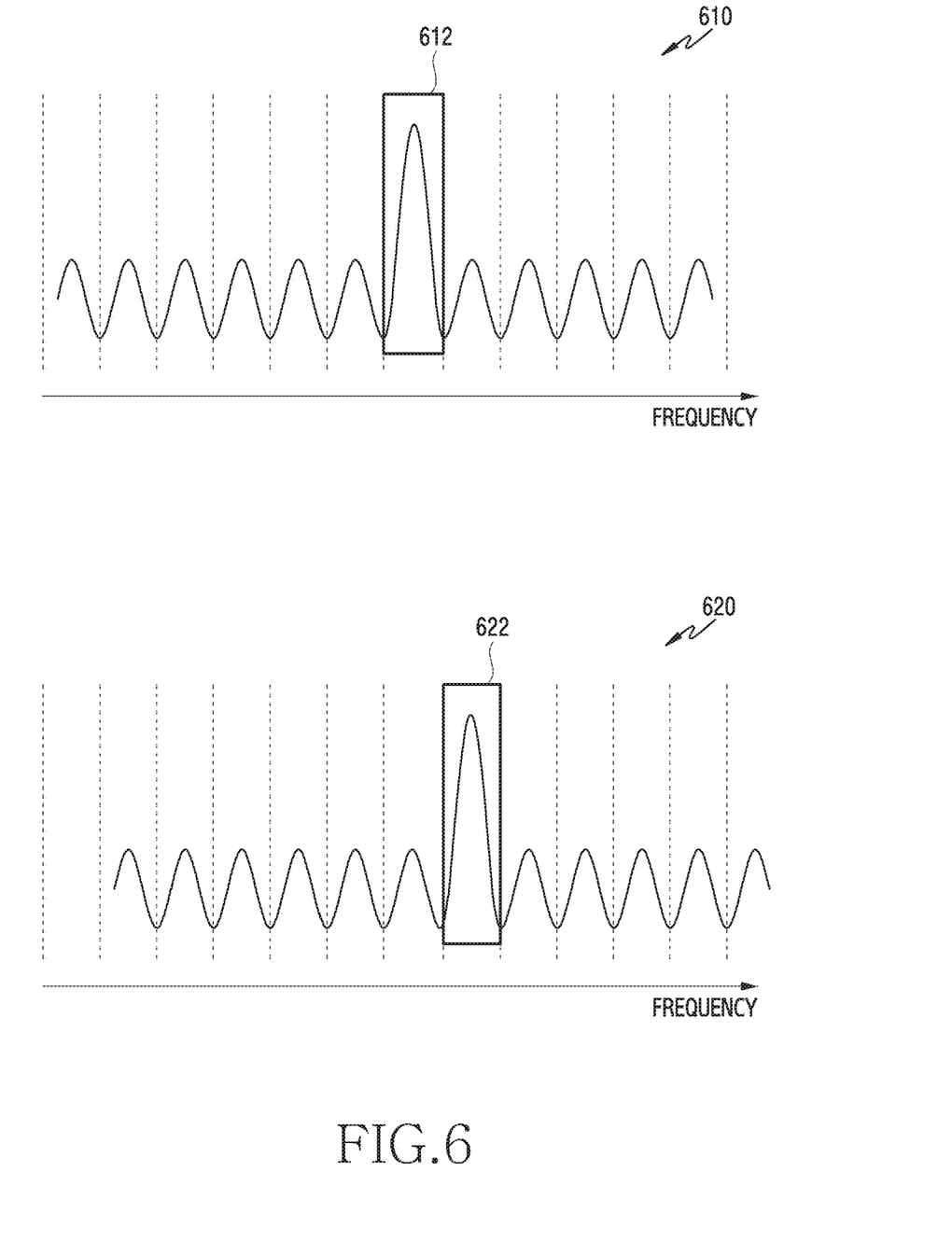
FIG. 6 illustrates examples of an extraction result of a measurement signal according to an embodiment of the disclosure.

FIG. 6 illustrates examples of an extraction result of a measurement signal according to an embodiment of the disclosure.

Referring to FIG. 6, the whole band may be divided into 11 bands, and each of a signal 610 and a signal 620 may be divided into 11 partial signals.

Referring again to FIG. 5, the measurement device identifies a measurement signal among the band-specific signals in operation 503. That is, the measurement device identifies a partial signal including a signal transmitted for measurement, among the plurality of partial signals. In this case, the measurement signal may be identified according to a predefined criterion. For example, the predefined criterion may be defined based on at least one of a value, a pattern, or a magnitude of a signal. As a specific example, the partial signal including the measurement signal may be a partial signal including a peak component. For example, as shown in FIG. 6, a partial signal 612 among the partial signals of the signal 610 and a partial signal 622 among the partial signals of the signal 620 may be selected as a signal including the measurement signal.

In operation 505, the measurement device stores and analyzes the measurement signal. The measurement device may store partial signals which are identified to include the measurement signal and discard the remaining partial signals. Thereafter, the measurement device may analyze the stored partial signals.

According to an embodiment described with reference to FIG. 5, the partial signal including the measurement signal may be the partial signal including the peak component. In this case, the measurement device may first perform an operation of determining whether another interference signal is detected in a corresponding band. If no other interference signal is detected, it is possible to assume that the peak component is the measurement signal during the measurement.

Figure 7:
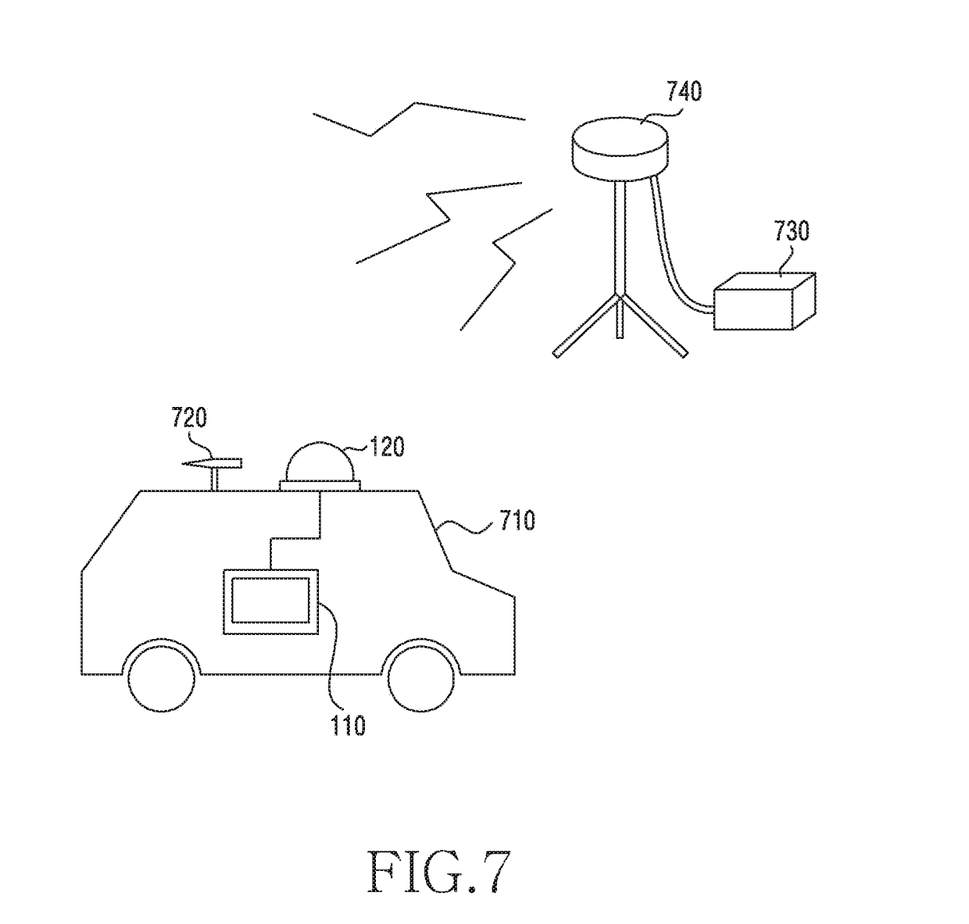
FIG. 7 illustrates an implementation example of a measurement device according to an embodiment of the disclosure.

FIG. 7 illustrates an implementation example of a measurement device according to an embodiment of the disclosure.

Referring to FIG. 7, the measurement device may be installed in a vehicle 710. For example, the signal analyzer 110 of the measurement device may be installed in the vehicle 710 and the receiver 120 may be installed on the vehicle 710. The receiver 120 may switch a plurality of directional antennas and receive signals like an omnidirectional antenna, and the signal analyzer 110 may extract and analyze only a required signal among the received signals. In addition, a GPS receiver 720 may be further installed on the vehicle 710, and the measurement device may estimate and correct angles of antennas by using a GPS signal received through the GPS receiver 720.

The measurement device installed in the vehicle 710 may be used for signal reception and measurement. In this case, a signal may be transmitted from a terminal or a base station of a target system. Otherwise, the signal may be transmitted by a device designed for measurement, for example, a signal generator 730 and a transmitter 740.

In order to reduce occurrence of the Doppler effect during radio wave propagation, signal collection may be configured with reference to the maximum signal after a bandwidth (BW) is configured at the time of signal reception.

Since a signal has a characteristic of rays at a high frequency, absolute angle allocation is configured for each antenna in cooperation with a DGPS in order to identify an arrival angle of a signal.

According to various embodiments described above, measurements at various arrival angles of a signal may be performed due to the use of multiple antennas and antenna position change. In addition, beamforming and multiple input multiple output (MIMO) channel analysis data may be secured through reception of a plurality of signals for each antenna. In particular, data acquisition may be performed several hundred times per second by using a switch, and signal strength and information on an arrival angle may be generated together for each received signal, and thus are easy to be utilized. Massive data including information on an arrival angle is utilized, so that regional channel estimation may be facilitated in a mmWave, and regional channel estimation information may be used to improve the accuracy of system design. The collected data may be used to extract individual antenna characteristics and the best signal for each interval, and an extracted signal may contribute to the improvement of the propagation model accuracy.

Methods according to embodiments stated in the claims and/or specification of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within an electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other types of optical storage devices, or a magnetic cassette. Alternatively, any combination of some or all of the above may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device for performing an embodiment of the disclosure via an external port. Further, a separate storage device on the communication network may access the device for performing an embodiment of the disclosure.

In the above-described embodiments of the disclosure, an element included in the disclosure is expressed in the singular or the plural according to a presented embodiment. However, the singular form or plural form is selected for convenience of description suitable for the presented situation, and various embodiments of the disclosure are not limited to a single element or multiple elements thereof. Further, either multiple elements expressed in the description may be configured as a single element or a single element in the description may be configured as multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A device for measuring a wireless signal, the device comprising:
    a first antenna set including a plurality of antennas having adjustable oriented directions;
    a second antenna set including a plurality of antennas having fixed oriented directions; and
    at least one processor configured to:
        determine oriented directions of at least one of the plurality of antennas,
        adjust vertical angle of at least one of the plurality of antennas included in the first antenna set based on the oriented directions,
        rotate the first antenna set and the second antenna set to certain horizontal angle based on the oriented directions,
        determine certain antenna having oriented direction corresponding to moving direction of the device,
        receive and analyze wireless signals by using the first antenna set and the second antenna set, and
        determine angle of arrival (AOA) of signals based on the wireless signals,
    wherein the plurality of antennas included in the first antenna set and the second antenna set are arranged in a hemispherical shape, the first antenna set is disposed on an upper end of the hemispherical shape, and the second antenna set is disposed on a lower end of the hemispherical shape,
    wherein one of the plurality of antennas included in the first antenna set and one of the plurality of antennas included in the second antenna set
    are arranged at the same horizontal angle to form an antenna pair, and
    wherein each antenna included in the antenna pair has different angle.

2. The device of claim 1,
    wherein the at least one processor is further configured to determine and adjust horizontal angle of the certain antenna based on the GPS signals, and
    wherein the moving direction is acquired based on location information from global positioning system (GPS).

3. The device of claim 1, wherein the plurality of antennas included in the first antenna set are configured to be movable in a vertical direction to adjust an oriented direction of a vertical axis.

4. The device of claim 1, further comprising a switching unit configured to connect at least one of the plurality of antennas to a reception path.

5. The device of claim 4, wherein the at least one processor is further configured to control the plurality of antennas to be sequentially connected to the reception path by using the switching unit.

6. The device of claim 1, further comprising an amplifier configured to amplify a signal received through at least one of the plurality of antennas.

7. The device of claim 1, wherein the at least one processor is further configured to:
  divide a received signal into band-specific partial signals, and
  select at least one partial signal including a measurement signal, among the partial signals.

8. The device of claim 7, wherein the at least one partial signal including the measurement signal comprises a partial signal including a peak component of the received signal.

9. The device of claim 1, wherein the at least one processor is further configured to store angle information relating to an oriented direction of an antenna as information on an arrival angle of a signal received through the antenna.

10. The device of claim 2, wherein the at least one processor is further configured to:
  determine and adjust horizontal angle of other antennas based on the horizontal angle of the certain antenna.

11. The device of claim 10, wherein the horizontal angle of the other antennas is determined based on number of antennas included in the second antenna group.

12. A method for measuring a wireless signal, the method comprising:
  determining oriented directions of at least one of the plurality of antennas;
  adjusting vertical angle of at least one of the plurality of antennas included in a first antenna set based on the oriented directions;
  rotating the first antenna set and a second antenna set to certain horizontal angle based on the oriented directions;
  determining certain antenna having oriented direction corresponding to moving direction of the device;
  receiving wireless signals by using the first antenna set and the second antenna set including a plurality of antennas having fixed oriented directions;
  analyzing the wireless signals; and
  determining angle of arrival (AOA) of signals based on the wireless signals,
  wherein the plurality of antennas included in the first antenna set and the second antenna set are arranged in a hemispherical shape, the first antenna set is disposed on an upper end of the hemispherical shape, and the second antenna set is disposed on a lower end of the hemispherical shape,
  wherein one of the plurality of antennas included in the first antenna set and one of the plurality of antennas included in the second antenna set
  are arranged at the same horizontal angle to form an antenna pair, and
  wherein each antenna included in the antenna pair has a different angle.

13. The method of claim 12, further comprising:
  determining and adjusting a horizontal angle of the certain antenna based on the GPS signals,
  wherein the moving direction is acquired based on location information from global positioning system (GPS).

14. The method of claim 12, wherein the adjusting of the oriented directions of the plurality of antennas comprises moving the plurality of antennas included in the first antenna set in a vertical direction to adjust an oriented direction of a vertical axis.

15. The method of claim 12, wherein the receiving of the wireless signals comprises controlling the plurality of antennas to be sequentially connected to a reception path.

16. The method of claim 12, further comprising amplifying a signal received through at least one of the plurality of antennas.

17. The method of claim 12, wherein the analyzing of the wireless signals comprises:
  dividing a received signal into band-specific partial signals; and
  selecting at least one partial signal including a measurement signal, among the partial signals.

18. The method of claim 17, wherein the at least one partial signal including the measurement signal comprises a partial signal including a peak component of the received signal.

19. The method of claim 12, wherein the analyzing of the wireless signals comprises storing angle information relating to an oriented direction of an antenna as information on an arrival angle of a signal received through the antenna.

20. The method of claim 13, further comprising:
  determining and adjusting horizontal angle of other antennas based on the horizontal angle of the certain antenna.

21. The method of claim 20, wherein the horizontal angle of the other antennas is determined based on number of antennas included in the second antenna group.

* * * * *